(12) United States Patent
Holman, IV et al.

(10) Patent No.: US 7,084,535 B2
(45) Date of Patent: Aug. 1, 2006

(54) DEFLECTION LIMITER FOR VIBRATOR MOTOR SHAFT

(75) Inventors: Martin E. Holman, IV, Boca Raton, FL (US); Oscar J. Pichardo, Parkland, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/903,381

(22) Filed: Jul. 30, 2004

(65) Prior Publication Data

US 2006/0022535 A1 Feb. 2, 2006

(51) Int. Cl.
*H02K 7/05* (2006.01)
(52) U.S. Cl. .......................................... 310/81; 74/87
(58) Field of Classification Search .................. 310/81, 310/67 R; 74/570.1, 87
See application file for complete search history.

(56) References Cited

U.S. PATENT DOCUMENTS

| | | | | |
|---|---|---|---|---|
| 4,940,336 A | * | 7/1990 | Dryga et al. ................. | 366/128 |
| 5,798,588 A | * | 8/1998 | Okuyama et al. ............. | 310/81 |
| 5,898,248 A | * | 4/1999 | Ikeda et al. ................... | 310/91 |
| 6,133,657 A | | 10/2000 | Semenik et al. | |
| 6,274,956 B1 | * | 8/2001 | Eule ............................. | 310/89 |
| 6,326,711 B1 | * | 12/2001 | Yamaguchi et al. .......... | 310/81 |
| 6,465,921 B1 | * | 10/2002 | Horng et al. ................. | 310/81 |

* cited by examiner

*Primary Examiner*—Dang Le

(57) ABSTRACT

A deflection limiting member (110, 310) or a deflection limiting mechanism (512, 514) is used to limit deflection of a motor shaft (102) of a vibrator (105, 305, 505) in a portable electronic device (104, 304, 504). The deflection limiting member (110, 310) extends in a radial direction from the motor shaft (102) on a side of the motor shaft (102) that is opposite to the center of gravity (108, 308) of an eccentric weight (108, 308). The deflection limiting member (110, 310) contacts a fixed surface such as a printed circuit board (112) to limit deflection of the motor shaft (102). The deflection limiting mechanism (512, 514) prevents an inertial force of an eccentric weight 510 from being applied directly to the motor shaft (102) under conditions in which there is a high risk of permanent deformation of the motor shaft (102).

22 Claims, 4 Drawing Sheets

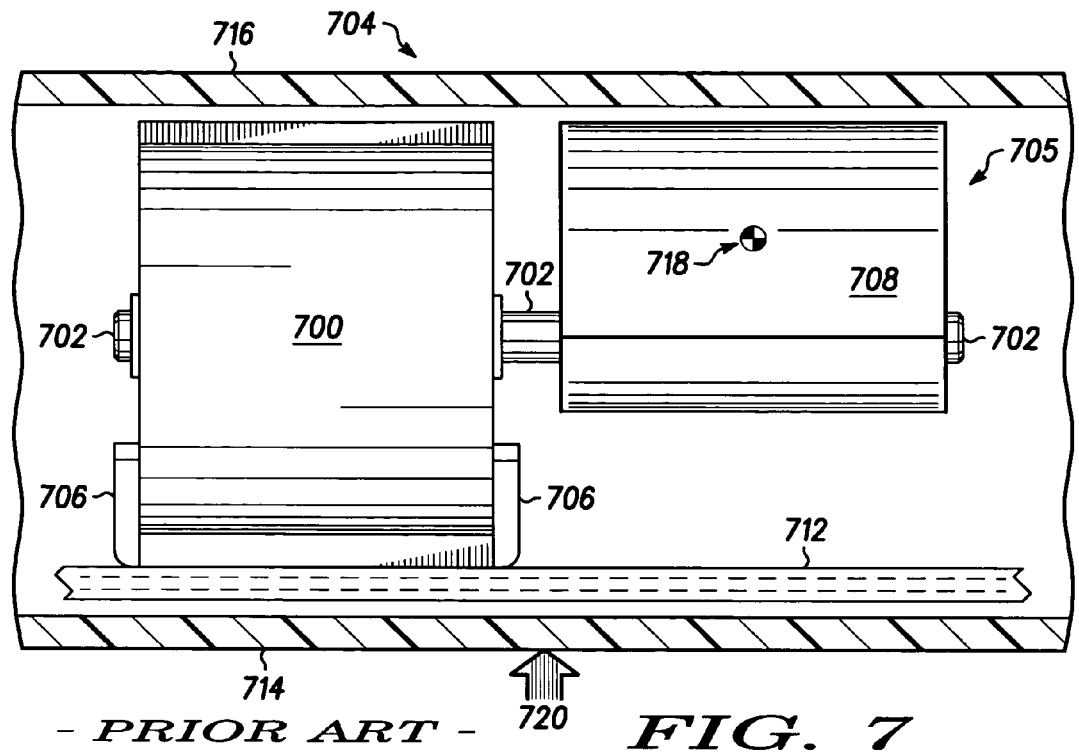
- PRIOR ART - FIG. 7
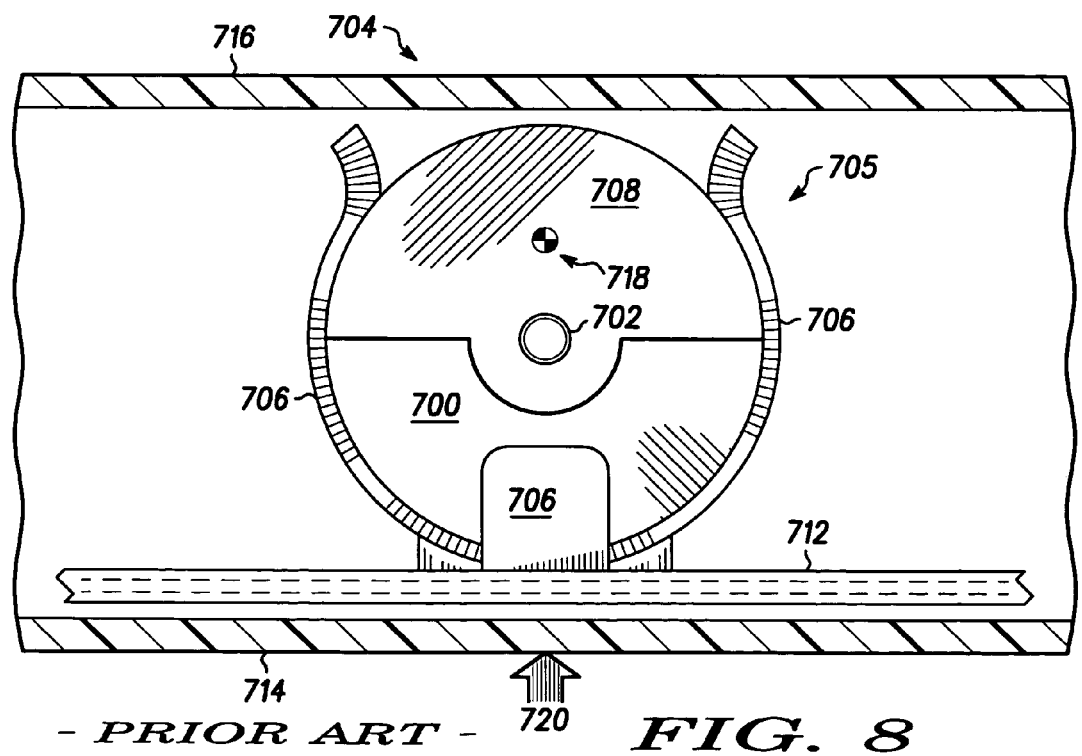
- PRIOR ART - FIG. 8

DEFLECTION LIMITER FOR VIBRATOR MOTOR SHAFT

FIELD OF THE INVENTION

This invention relates in general to vibrators for portable electronic devices such as wireless communication devices, and more particularly, to a device for limiting deflection of a motor shaft of a vibrator in a portable electronic device.

BACKGROUND OF THE INVENTION

Portable electronic devices and wireless telecommunication devices such as mobile telephones and pagers typically include vibrators for quietly signaling an event such as an alarm or that a call has been received. If the portable electronic device is touching the user or is in close proximity to the user, the user will hear or feel the vibration and will know that an event has occurred or that a call is being received.

FIGS. 7 and 8 show a typical vibrator 705 for a wireless communication device 704. A motor 700 is held by a motor bracket 706 within a housing of the wireless communication device, and the motor bracket 706 is fixed to a printed circuit board 712. An eccentric weight 708 is fixed to a metal motor shaft 702 in an eccentric position. That is, the center of gravity 718 of the eccentric weight 708 is offset from the axis of the motor shaft 702. When the motor 700 rotates the eccentric weight 708, vibration is created, which is transmitted to the housing of the wireless communication device 704.

If the wireless communication device 704 is dropped, the motor shaft 702 may be permanently bent due to an inertial force applied to the motor shaft 702 by the eccentric weight 708. For example, if the portable electronic device 704 is dropped such that a generally flat surface of a first housing member 714 strikes a hard surface, an impact force 720 is applied to the housing and a great amount of stress may be applied to the motor shaft 702, which may cause the motor shaft 702 to permanently deform, due to the inertia of the eccentric weight 708. If the motor shaft 702 deforms permanently, there is a good chance that the vibrator will be disabled or will generate noise due to interference between the eccentric weight 708 and other parts in the housing.

Typically, the motor 700 is oriented such that the axis of the motor shaft 702 is parallel to a planar or generally planar external housing member 716, 714. Thus, the risk of permanent deformation of the motor shaft 702 is particularly great when the portable electronic device 704 falls such that the axis of the motor shaft 702 is parallel to the ground when the portable electronic device 704 strikes the ground. That is, if the motor shaft 702 is parallel to the ground when the portable electronic device 704 strikes the ground, the force of impact 720 is perpendicular to the motor shaft 702, and the resulting stress on the motor shaft 702 is maximized as compared to other motor shaft orientations.

Furthermore, the risk of permanent deformation of the motor shaft 702 is greater when the center of gravity 718 of the eccentric weight 708 is located on an opposite side of the axis of the motor shaft 702 from the point of impact at which the housing strikes the ground. That is, when the axis of the motor shaft 702 is directly between the center of gravity 718 of the eccentric weight 708 and the point of impact, then inertial force that the eccentric weight 708 applies to the motor shaft 702 is applied directly to the motor shaft 702 and maximizes the stress on the motor shaft 702. Thus, FIGS. 7 and 8 represent an orientation of the eccentric weight 708 and the axis in which the risk of permanent deformation of the motor shaft 702 is the greatest, since the axis of the motor shaft 702 is between the center of gravity 718 and the point of application of an impact force 720, and the impact force is perpendicular to the axis of the shaft. Thus, under the conditions of FIGS. 7 and 8, the motor shaft 702 will deform in the downward direction of the figures as a result of the impact force 720, and permanent deformation of the motor shaft 702 may result.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 7 is a partial cross sectional view of a portable electronic device showing a side of a conventional vibrator; and FIG. 8 is a partial cross sectional view of a portable electronic device showing an end of the vibrator of FIG. 7.

DETAILED DESCRIPTION OF PREFERRED EMBODIMENTS

The present disclosure concerns portable electronic devices such as portable digital assistants (PDAs) and wireless communications devices that provide services such as voice and data communications services to communications devices or units, often referred to as subscriber devices, cellular phones, mobile telephones, radios and pagers.

More particularly, various inventive concepts and principles embodied in a deflection limiter for a portable electronic device are discussed. The portable electronic device can be any of a variety of wireless communication devices, such as a cellular handset, a pager, or equivalents thereof. Further, the portable electronic device can be a PDA, a portable digital music player, or a portable computer, or the like.

As further discussed below, various inventive principles and combinations thereof are advantageously employed to provide a deflection limiter for a vibration motor, thus alleviating various problems associated with known portable electronic devices provided these principles or equivalents thereof are employed.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Figure 1:
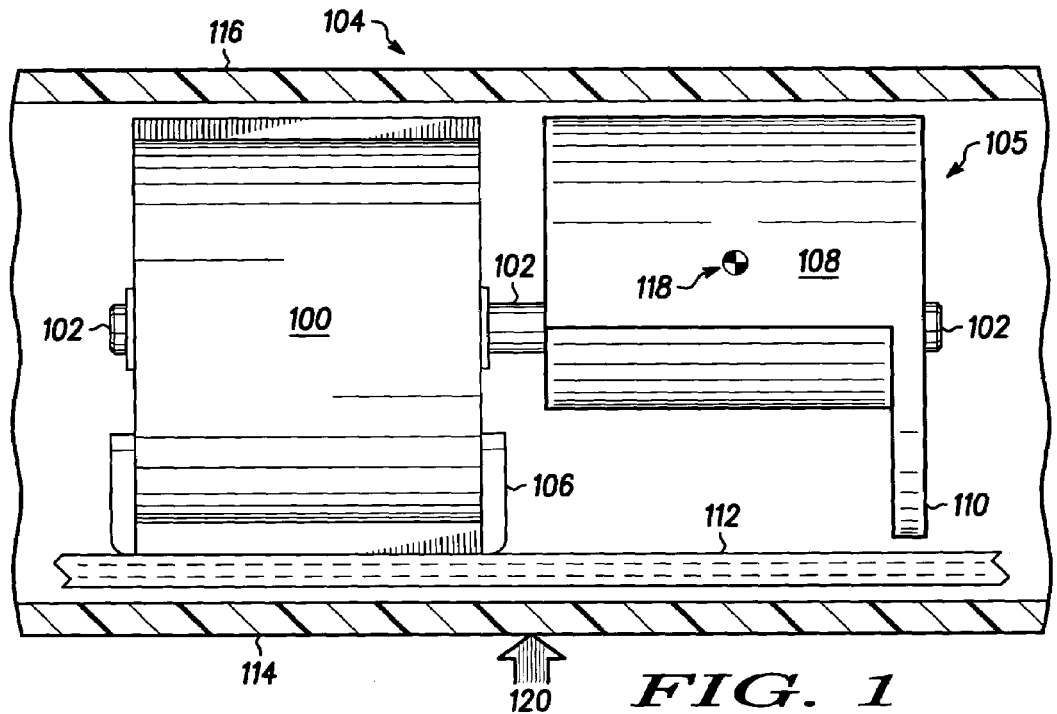
FIG. 1 is a partial cross sectional view of a portable electronic device showing a side of a vibrator.

Basically, as shown in FIG. 1, in one embodiment according to the present invention a portable electronic device 104 includes a housing. The housing includes a first housing member 114, and a second housing member 116, both of which are generally planar. In this embodiment, the housing is made of plastic. Within the housing are various electronic parts of the portable electronic device 104. For example, if the portable electronic device 104 is a wireless communication device, a transmitter, a receiver, a user interface, or a controller, which are well-known and unillustrated, is located within the housing. Also, within the housing is a vibrator 105 for signaling, for example, that a call is being received or the like by the portable electronic device 104. Typically, in a wireless communication device, users have the option of turning an audible signaling device, such as a ringer (e.g. speaker or earpiece), on and off. Further, users typically have the option to turn a vibrator on when they wish to be alerted to incoming calls or events silently. The control of the vibrator 105 is outside the scope of the present invention, is well known, and is not described here. The vibrator 105 of the present invention is described in detail below.

A generally planar substrate, or printed circuit board 112, is supported by the housing. The printed circuit board 112 supports the vibrator 105 and other unillustrated parts. The vibrator 105 includes a motor 100, which is held by a retaining bracket 106. The retaining bracket 106 is firmly fixed to the printed circuit board 112 by solder (not illustrated) or other known fasteners so that vibration produced by the vibrator 105 will not cause the motor to separate from the printed circuit board 112. The motor 100 is electrically coupled to the printed circuit board 112 to permit a voltage to be applied to the motor 100 in a well known, unillustrated manner. In the illustrated embodiment, the bracket 106 permits the motor 100 to be removed for repair or replacement.

The motor 100 includes a motor shaft 102, which has a central rotational axis. The motor 100 is fixed to the housing such that the axis of the motor shaft 102 is parallel or substantially parallel to the plane of the first and second housing members 114, 116 and to the plane of the printed circuit board 112. An eccentric weight 108 is fixed to the motor shaft 102 so that the eccentric weight 108 cannot rotate with respect to the motor shaft 102. The material of the eccentric weight 108 may be titanium due to its high density, which permits the eccentric weight 108 to be relatively small.

The motor shaft 102 is unsupported at its distal end, thus the eccentric weight 108 is supported in cantilever fashion by the motor shaft 102. The center of gravity 118 of the eccentric weight 108 is offset in the radial direction from the axis of the shaft 102. Thus, vibration is created when the motor 100 rotates the eccentric weight 108. The vibration is transmitted through the printed circuit board 112 to the housing and thus to the user of the device.

A deflection limiting member 110 may be formed integrally and unitarily with the eccentric weight 108 to limit deflection of the motor shaft 102 when the portable electronic device 104 is dropped. In the embodiment of FIG. 1, the deflection limiting member 110 is disc-like and semi-cylindrical and is formed at the distal end of the eccentric weight 108 in the manner shown. The deflection limiting member 110 is located on an opposite side of the motor shaft 102 from the center of gravity 118. Although the deflection member 110 is shown as being integral with the eccentric weight 108, the deflection limiting member 110 may be separate and attachable to the eccentric weight 108.

Figure 2:
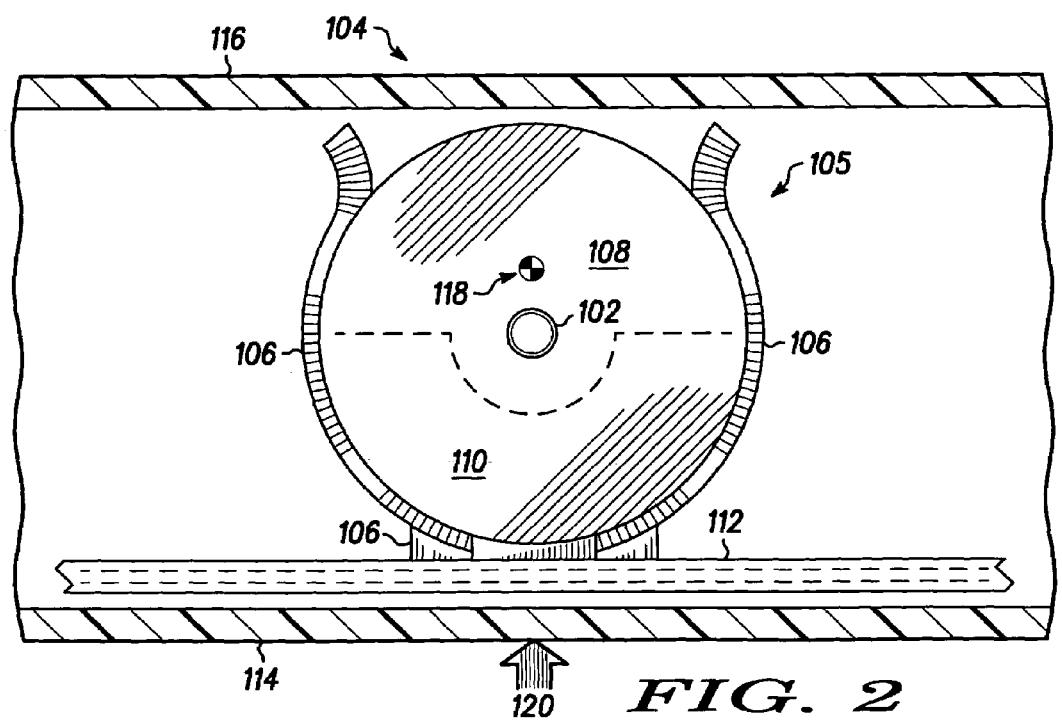
FIG. 2 is a is a partial cross sectional view of a portable electronic device showing an end of the vibrator of FIG. 1.

If deflection of the motor shaft 102 exceeds a predetermined value in the downward direction of FIGS. 1 and 2, the deflection limiting member 110 contacts a fixed surface, which in the illustrated embodiment is the surface of the printed circuit board 112, to limit further deflection of the motor shaft 102. If the portable electronic device 104 is dropped such that an impact force 120 is applied to the first housing member 114, inertia will cause the eccentric weight 108 to move toward the printed circuit board 112, which will cause the motor shaft 102 to deflect and move toward the printed circuit board 112. However, in the position of the eccentric weight 108 that is illustrated in FIGS. 1 and 2, the movement of the eccentric weight 108 toward the printed circuit board 112 is limited by the deflection limiting member 110 due to contact between the outermost surface of the deflection limiting member 110 and the facing surface of the printed circuit board 112. If the eccentric weight 108 were rotated one-hundred and eighty degrees about the axis from the position illustrated in FIGS. 1 and 2, the eccentric weight 108 would contact the printed circuit board 112 to limit deflection from the impact force 120. The radial extent of the deflection limiting member 110 can be the same as that of the eccentric weight 108. The deflection limiting member 110 can be formed at the distal end of the eccentric weight 108 because deflection of the motor shaft 102 is greatest at its distal end. That is, the maximum radius of the deflection limiting member can be equal to a maximum radius of the eccentric weight.

If the portable electronic device 104 is dropped such that an impact force is applied to the second housing member 116 in a direction opposite to the impact force 120, the eccentric weight 108 will move toward the second housing member 116 due to inertia. Depending on the rotational position of the eccentric weight 108, either the eccentric weight 108 or the deflection limiting member 110 will contact the second housing member 116 to limit deflection of the motor shaft 102. In the illustrated embodiment, a second housing member 116 serves to limit deflection of the motor shaft in the upward direction of FIG. 1; however one of ordinary skill in the art could select other fixed surfaces within the portable electronic device 104 to serve this purpose. Thus, in the embodiment of FIG. 1, deflection of the motor shaft 102 occurring in a plane that is perpendicular to the two housing members 114, 116 and that includes the axis of the motor shaft 102 is limited regardless of the rotational position of the motor shaft 102.

A clearance gap is formed between the outermost surface of the deflection limiting member 110 and the printed circuit board 112 and between the outermost surface of the deflection limiting member 10 and the second housing member 116. The clearance gap, which is measured along a line that is radial to the motor shaft 102 and perpendicular to the printed circuit board 112, is predetermined to permit some deflection of the motor shaft 102. However, the clearance gap is set to prevent a degree of deflection of the motor shaft 102 that would result in permanent deformation of the motor shaft 102.

Although the fixed surface that is contacted by the deflection limiting member 110 in the illustrated embodiment is the printed circuit board 112 in the illustrated embodiment of FIGS. 1 and 2, any of a number of fixed surfaces inside the portable electronic device 104 can be used to limit deflection of the motor shaft 102. For example, the motor bracket 106 may be fixed directly to one of the housing members such as the first housing member 114, instead of the printed circuit board 112, and the deflection limiting member 110 may contact the surface of the first housing member 114 when limiting deflection of the motor shaft 102 in response to the impact force 120. Furthermore, fixed surfaces may be located at other positions around the eccentric weight 108 so that deflection of the motor shaft 102 is limited when impact forces are applied to other surfaces of the housing.

FIGS. 1 and 2 show one of the worst orientations of the eccentric weight 108 with respect to the motor shaft 102 and the housing, since the center of gravity 118, the axis of the motor shaft 102 and the impact force 120 are in alignment. Under these circumstances, the motor shaft 102 is under the most stress and is most likely to permanently deform. However, the deformation under these circumstances is limited by the deflection limiting member 110. If the center of gravity 118 is misaligned with the axis of the motor shaft 102 and the line of the impact force, then the inertia of the eccentric weight 108 will tend to rotate the eccentric weight 108, and will not place as much stress on the motor shaft 102. Therefore, it is often not necessary to limit deflection of the motor shaft 102 in every direction. It is sufficient to limit deflection in the direction or directions in which permanent deformation of the motor shaft 102 is most likely to occur. This depends on the shape of the housing among other things. When a housing member is generally planar and the portable electronic device 104 falls such that the impact force is perpendicular to the generally planar surface and perpendicular to the motor shaft 102, it is desirable to limit the deflection of the motor shaft 102 along a line that is perpendicular to the generally planar housing member as shown in FIGS. 1 and 2.

In general, the maximum stress in the motor shaft 102 can be calculated according to the following equation:

$$\sigma = \frac{3ED}{2L^2}d$$

in which σ represents the maximum stress on the motor shaft 102, E represents the modulus of elasticity of the material of the motor shaft 102, D represents the diameter of the motor shaft 102, L represents the length of the motor shaft 102, and d represents the maximum deflection of the end of the motor shaft 102. Between the prior art design of FIGS. 7 and 8 and the embodiment of FIGS. 1 and 2, the only value that changes in this equation is the maximum deflection d. Thus, by limiting the value of d, one can limit the value of the maximum stress σ. The value of d can be limited by selecting the clearance gap between the printed circuit board 112 and the outermost surface of the deflection limiting member 110. The same minimum clearance gap should be used between all the fixed surfaces that are being used for deflection limiting and the deflection limiting member. For example, in the embodiment of FIGS. 1 and 2, the clearance gap between the second housing member 116 and the eccentric weight 108 is the same as that between the printed circuit board 112 and the deflection limiting member 110.

In choosing the value of the clearance gap and the maximum deflection d, by using the equation above, the deformation of the motor shaft 102 can be limited to substantially elastic deformation. In other words, the clearance gap is chosen such that the deflection limiting member substantially prevents permanent deformation of the motor shaft 102. Even if the yield stress of the metal of the motor shaft 102 is exceeded at its most stressed region, in order for significant and detrimental permanent deformation to occur, the yield stress would have to be exceeded throughout most of the cross section of the motor shaft 102. Therefore, the clearance gap need not be selected to entirely avoid exceeding the yield stress of the motor shaft material, as long as significant permanent deformation of the motor shaft 102 does not occur under the worst-case conditions illustrated in FIGS. 1 and 2.

Figure 3:
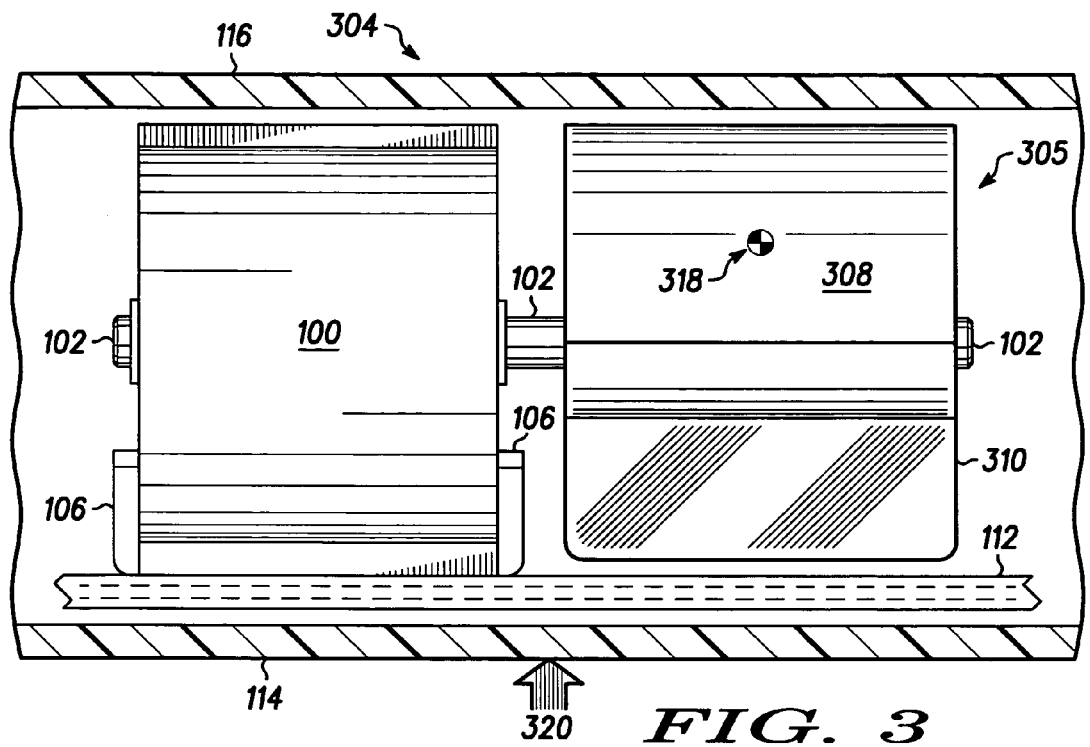
FIG. 3 is a is a partial cross sectional view of a portable electronic device showing a side of a vibrator of a second embodiment of the present invention.
Figure 4:
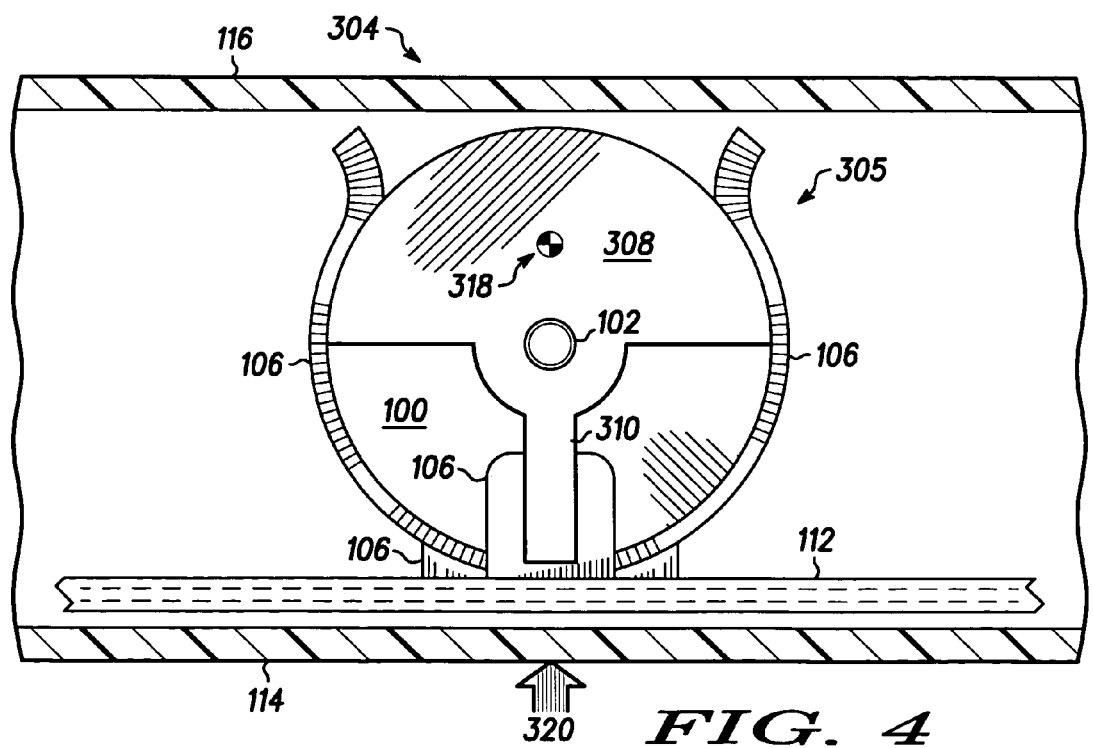
FIG. 4 is a is a is a partial cross sectional view of a portable electronic device showing an end of the vibrator of FIG. 3.

FIGS. 3 and 4 show an alternative portable electronic device 304 in which a vibrator 305 is installed. In the embodiment of FIGS. 3 and 4, the parts are the same as those of the first embodiment, except that the eccentric weight 108 and the deflection limiting member 110 have been replaced by an eccentric weight 308 and a deflection limiting member 310. A description of the parts that are common to both embodiments will not be repeated.

As shown in FIG. 3, the deflection limiting member 310 is a rib extending radially from the motor shaft 102 on the opposite side of the motor shaft 102 from the center of gravity 318. The rib-shaped deflection limiting member 310 abuts against the printed circuit board 112 to limit deflection of the motor shaft 102 when the eccentric weight 308 is in the position shown in FIG. 4 and the housing receives an impact force 320. The rib, or the deflection limiting member 310, need not extend along the entire length of the eccentric weight 308. In other words, the deflection limiting member 310 may be a simple leg-like member that extends radially from the distal end of the eccentric weight 308.

Figure 5:
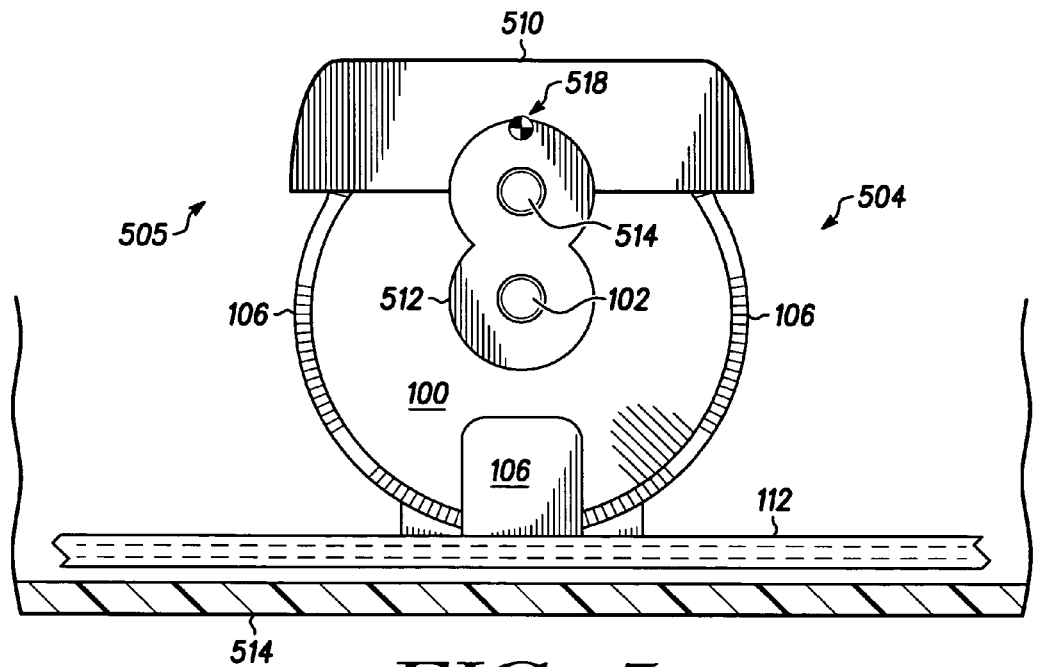
FIG. 5 is a is a is a partial cross sectional view of a portable electronic device showing an end of a vibrator of a third embodiment of the present invention.
Figure 6:
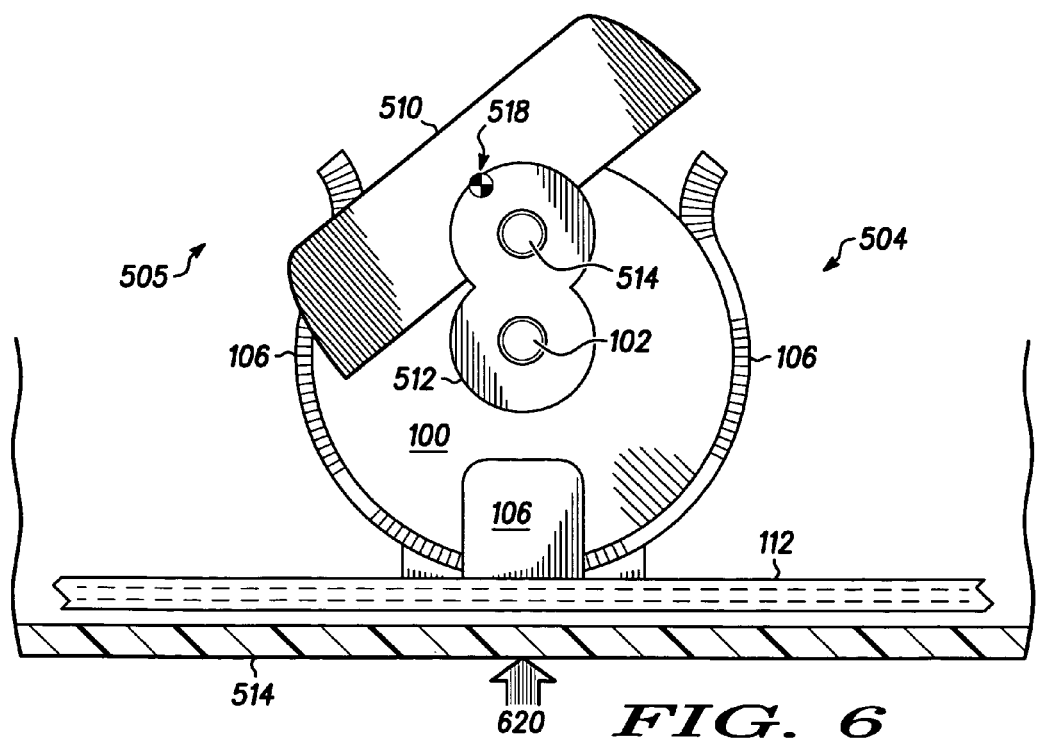
FIG. 6 is a is a partial cross sectional view like FIG. 5 showing the eccentric weight pivoted from its position in FIG. 5.

FIGS. 5 and 6 show a further embodiment of the present invention in which a vibrator 505 is installed in a portable electronic device 504. In FIGS. 5 and 6, common reference numerals are used for parts that are common to the embodiment of FIGS. 1 and 2, and the description of the common parts will not be repeated.

In the embodiment of FIGS. 5 and 6, deflection of the motor shaft 102 is limited by a hinge mechanism in which a hinge is offset from the axis of the motor shaft 102. As shown in FIG. 5, a hinge member 512 is fixed to the motor shaft 102 such that the hinge member 512 cannot rotate with respect to the motor shaft 102. An eccentric weight 510 is pivotally connected to the hinge member 512 by a pivot shaft 514. The center of gravity 518 of the eccentric weight 510 is offset from the axis of the motor shaft 102, such that vibration is created when the motor 100 is driven. The eccentric weight 510 may thus pivot freely about the axis of the pivot shaft 514.

FIG. 6 shows a condition of the device of FIG. 5 in which the motor 100 is stopped when the axis of the pivot shaft 514 and the axis of the motor shaft 102 are aligned with a line representing the direction of an impact force 620, which results from dropping the portable electronic device 504 in which the vibrator 505 is installed. In this condition, the eccentric weight 510 will pivot to one side or the other of the pivot shaft 514, due to the lack of friction between the pivot shaft 514 and the hinge member 512. While there is sufficient resistance to rotation in the motor 100 to prevent the hinge member 512 from rotating when the motor 100 stops, there is insufficient resistance in the joint of the pivot shaft 514 to prevent the eccentric weight 510 from pivoting. Thus, if the motor 100 stops when the center of gravity 518, the axis of the pivot shaft 514 and the axis of the motor shaft 102 are in alignment with a line that is perpendicular to a housing member 514, the eccentric weight will pivot to misalign the center of gravity 518. Therefore, if an impact force 620 is applied to the housing member 514, the inertia of the eccentric weight 510 will tend to rotate the eccentric weight 510 and the motor shaft 102. Thus, the inertial force of the eccentric weight 510 is not directly applied to the motor shaft 102 in a manner that deflects the motor shaft 102 and maximizes stress in the motor shaft 102. Thus, the hinge member 512 and the pivot shaft 514 serve to limit deflection of the motor shaft 102 under conditions in which stress on the motor shaft 102 would otherwise be maximized.

The apparatus discussed above and the inventive principles thereof are intended to and will alleviate problems with conventional portable units. Using these principles of limiting motor shaft deflection will contribute to user satisfaction. It is expected that one of ordinary skill given the above described principles, concepts and examples will be able to implement other alternative procedures and constructions that offer the same benefits. It is anticipated that the claims below cover many such other examples. For example, the deflection limiting members 110, 310 of FIGS. 1–4 are shown to be integrally and unitarily formed with the eccentric weights 108, 308. However, the deflection limiting members 110, 310 may be separate from their respective eccentric weights 108, 308 and separately fixed to the motor shaft 102.

The disclosure is intended to explain how to fashion and use various embodiments in accordance with the invention rather than to limit the true, intended and fair scope and spirit thereof. The forgoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A vibrator in a portable electronic device, wherein the vibrator comprises:
   a motor, wherein the motor has a motor shaft, and the motor shaft has an axis;
   an eccentric weight fixed to the motor shaft, wherein the center of gravity of the weight is offset from the axis in a radial direction, and the eccentric weight is located on a first side of the motor shaft; and
   a deflection limiting member fixed to the motor shaft, wherein the deflection limiting member extends from the motor shaft on a second side of the motor shaft, which is opposite to the first side of the motor shaft, wherein, if deflection of the motor shaft exceeds a predetermined value, the deflection limiting member contacts a fixed surface of the portable electronic device and limits further deflection of the motor shaft;
   wherein the fixed surface is a circuit board that supports the motor and is positioned below the deflection limiting member.

2. The vibrator according to claim 1, wherein the predetermined value is such that deformation of the motor shaft is limited to substantially elastic deformation and the deflection limiting member substantially prevents permanent bending of the motor shaft.

3. The vibrator according to claim 1, wherein the deflection limiting member extends radially from the motor shaft.

4. The vibrator according to claim 1, wherein the deflection limiting member is a rib extending radially from the motor shaft.

5. The vibrator according to claim 4, wherein the deflection limiting member is formed integrally and unitarily with the eccentric weight.

6. The vibrator according to claim 1, wherein the deflection limiting member has a semi-cylindrical shape.

7. The vibrator according to claim 6, wherein the deflection limiting member is formed integrally and unitarily with the eccentric weight.

8. The vibrator according to claim 1, wherein a maximum radius of the deflection limiting member is equal to a maximum radius of the eccentric weight.

9. The vibrator according to claim 1, wherein the deflection limiting member is located at a distal end of the motor shaft.

10. The vibrator according to claim 1, wherein the eccentric weight is supported in cantilever-fashion by the motor shaft and the motor shaft is unsupported at its distal end.

11. The vibrator according to claim 1, wherein the motor shaft is parallel to a plane of the circuit board.

12. The vibrator according to claim 1, wherein at least a part of the deflection limiting member is located in a position that is directly opposite to the center of gravity of the eccentric weight.

13. The vibrator according to claim 1, wherein the vibrator is part of a wireless communication device.

14. The vibrator according to claim 1, wherein the vibrator is part of one of a portable digital assistant, a cellular telephone, or a pager.

15. A vibrator in a portable electronic device, wherein the vibrator comprises:
   a motor, wherein the motor has a motor shaft, and the motor shaft has an axis;
   an eccentric weight fixed to the motor shaft, wherein the center of gravity of the eccentric weight is offset from the axis in a radial direction;
   a hinge member for connecting the eccentric weight to the motor shaft, wherein the hinge member is fixed to the motor shaft; and
   a pivot joint that connects the eccentric weight to the hinge member such that the eccentric weight can freely pivot with respect to the hinge member, wherein the pivot joint has an axis, and the axis of the pivot joint is parallel to and offset from the axis of the motor shaft.

16. The vibrator according to claim 15, wherein the eccentric weight is supported in cantilever-fashion by the motor shaft and the motor shaft is unsupported at its distal end.

17. The vibrator according to claim 15, wherein the portable electronic device has a housing, and the housing has a generally planar surface, and the axis of the motor is parallel to the generally planar surface of the housing, and wherein the pivot joint prevents a condition in which the center of gravity of the eccentric weight, the axis of the pivot joint, and the axis of the motor shaft are in alignment with a line that is substantially perpendicular to the generally planar surface of the housing when the motor is stopped.

18. The vibrator according to claim 15, wherein the motor is fixed to a generally planar printed circuit board such that the axis of the motor shaft is parallel to a plane of the printed circuit board.

19. The vibrator according to claim 15, wherein the vibrator is part of one of a cellular telephone, a personal digital assistant, and a portable computer.

20. A vibrator in a portable electronic device, wherein the vibrator comprises:
  a motor, wherein the motor has a motor shaft, and the motor shaft has an axis;
  an eccentric weight fixed to the shaft, wherein the center of gravity of the eccentric weight is offset from the axis in a radial direction; and
  means for limiting deformation of the motor shaft when an impact force is applied to the portable electronic device;
  wherein the means for limiting deformation of the motor shaft includes:
  a hinge member for connecting the eccentric weight to the motor shaft, wherein the hinge member is fixed to the motor shaft; and
  a pivot joint that connects the eccentric weight to the hinge member such that the eccentric weight can freely pivot with respect to the hinge member, wherein an axis of the pivot joint is parallel to and offset from the axis of the motor shaft.

21. The vibrator according to claim 20, wherein the means for limiting deformation of the motor shaft includes a deflection limiting member, which is fixed to the motor shaft and extends radially from the motor shaft on an opposite side of the motor shaft from the center of gravity of the eccentric weight, wherein, if deflection of the motor shaft exceeds a predetermined value, the deflection limiting member contacts a fixed surface of the portable electronic device and limits further deflection of the motor shaft.

22. A vibrator in a portable electronic device, wherein the vibrator comprises:
  a motor, wherein the motor has a motor shaft, and the motor shaft has an axis;
  an eccentric weight fixed to the shaft, wherein the center of gravity of the eccentric weight is offset from the axis in a radial direction; and
  a device that limits deformation of the motor shaft when an impact force is applied to the portable electronic device, wherein the device includes one of:
  a deflection limiting member, which is located on an opposite side of the axis from the center of gravity of the eccentric weight, wherein, if deflection of the motor shaft exceeds a predetermined value, the deflection limiting member contacts a fixed support surface of The portable electronic device and limits further deflection of the motor shaft; and
  a hinge member for connecting the eccentric weight to the motor shaft, wherein the hinge member is fixed to the motor shaft, wherein a pivot joint connects the eccentric weight to the hinge member such that the eccentric weight can freely rotate with respect to the hinge member, and wherein an axis of the pivot joint is parallel to and offset from the axis of the motor shaft.

* * * * *